United States Patent
Melancon et al.

(10) Patent No.: US 7,560,507 B2
(45) Date of Patent: Jul. 14, 2009

(54) ADHESIVE

(75) Inventors: Kurt C. Melancon, White Bear Lake, MN (US); Mark E. Fagan, Woodbury, MN (US); Scott D. Pearson, Woodbury, MN (US); William J. Hunt, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 354 days.

(21) Appl. No.: 11/668,336

(22) Filed: Jan. 29, 2007

(65) Prior Publication Data

US 2007/0137791 A1    Jun. 21, 2007

Related U.S. Application Data

(63) Continuation of application No. 10/884,302, filed on Jul. 2, 2004, now Pat. No. 7,348,378.

(60) Provisional application No. 60/530,591, filed on Dec. 18, 2003.

(51) Int. Cl.
C04B 24/26  (2006.01)
C04B 37/00  (2006.01)
B32B 27/30  (2006.01)

(52) U.S. Cl. .................. 524/563; 156/325; 524/501; 442/147

(58) Field of Classification Search .......... 524/563, 524/501; 442/174; 156/325
See application file for complete search history.

(56) References Cited

U.S. PATENT DOCUMENTS

| | | |
|---|---|---|
| 3,011,985 A | 12/1961 | Breslouf et al. |
| 3,072,482 A | 1/1963 | Beeber et al. |
| 3,309,328 A | 3/1967 | Carroll et al. |
| 4,059,114 A | 11/1977 | Richards |
| 4,162,238 A | 7/1979 | Bergna |
| 4,471,082 A | 9/1984 | Kwok et al. |
| 5,284,897 A | 2/1994 | Columbus et al. |
| 5,306,749 A | 4/1994 | Columbus et al. |
| 5,322,880 A | 6/1994 | Columbus et al. |
| 5,416,140 A | 5/1995 | Columbus et al. |
| 5,473,005 A | 12/1995 | Columbus et al. |
| RE35,144 E | 1/1996 | Columbus et al. |
| 6,423,379 B1 | 7/2002 | Ewing |
| 2003/0044535 A1* | 3/2003 | Goobich ............... 427/256 |
| 2003/0077429 A1 | 4/2003 | Schulz |
| 2003/0109620 A1 | 6/2003 | Zecha et al. |
| 2003/0158324 A1 | 8/2003 | Maxim |
| 2003/0163957 A1 | 9/2003 | Chen |
| 2004/0011250 A1 | 1/2004 | Calienni |
| 2004/0039095 A1 | 2/2004 | Jiratumnukul |
| 2004/0072003 A1 | 4/2004 | Choi et al. |

FOREIGN PATENT DOCUMENTS

| | | |
|---|---|---|
| AU | 8313818 | 10/1983 |
| DE | 3724331 | 2/1989 |
| EP | 22550 | 1/1981 |
| GB | 2294466 A | 5/1996 |
| JP | 56014558 | 2/1981 |
| WO | WO 93/21279 | 10/1993 |

* cited by examiner

*Primary Examiner*—David Wu
*Assistant Examiner*—Michael M Bernshteyn
(74) *Attorney, Agent, or Firm*—Trisha D. Adamson

(57) ABSTRACT

A method is disclosed. The method comprises combining at least a polymer adhesive material, a thickener, and water to form adhesive compositions having a pH of 4 to 10, and identifying the adhesive compositions having a stringing length of 9 cm or less and one or more of the following properties: a set time of 180 seconds or less, a phase lag of 45 degrees or less, a viscosity of 3,000 to 50,000 cP, a complex shear modulus of 50 to 1000 Pa, and a sag distance of 10 mm or less.

19 Claims, 1 Drawing Sheet

ADHESIVE

CROSS-REFERENCE TO RELATED APPLICATIONS

This application is a continuation of U.S. application Ser. No. 10/884,302 filed on Jul. 2, 2004 now U.S. Pat. No. 7,348,378, which claims priority from provisional U.S. Application No. 60/530,591 filed Dec. 18, 2003 entitled CRAFT OBJECTS.

BACKGROUND

This invention relates to improved adhesives. Specifically, the invention relates to improved adhesives that exhibit improved dispensability properties.

Typical consumer adhesives or white glues are formulated at 40 to 60 percent solids and have a viscosity ranging from 2,000 to 300,000 cP as measured by on a Brookfield viscometer. These adhesives or white glues have a variety of shortcomings such as, for example, regardless of viscosity, the glues run or sag when applied to a vertical surface. In addition, these glues suffer from imprecise dispensability. Low viscosity glues are excessively runny and high viscosity glues are excessively stringy.

In general, the more viscous glues tend to be slow to "set" and are difficult to obtain in thin sections since they do not spread easily under modest stress. Thick glue sections can be undesirable since upon drying, they exacerbate curl and cockle effects in paper substrates. Thus, there is a need for an improved adhesive.

SUMMARY

Generally, the present invention relates to improved adhesives, their manufacture, and apparatus for dispensing the improved adhesive. In an illustrative embodiment, an adhesive composition includes a polymer adhesive material and a thickener. The adhesive composition has a stringing length of 9 cm or less and a phase lag, δ, (hereinafter referred to as "phase tag") of 45 degrees or less, or a sag distance of 5 mm or less. The adhesive can be formed by combining a vinyl acetate polymer, an alkali swellable thickener, an alkali material, and water.

In another illustrative embodiment, an article includes a dispenser container having a dispensing opening and an adhesive composition disposed within the dispenser container. The adhesive composition includes a polymer adhesive material and a thickener. The adhesive composition has a stringing length of 9 cm or less and a phase lag of 45 degrees or less.

In another illustrative embodiment, an adhesive composition includes a vinyl acetate polymer, an alkali swellable thickener, and water. The vinyl acetate polymer is dispersed within the water and the adhesive composition has a pH of 4 to 10.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
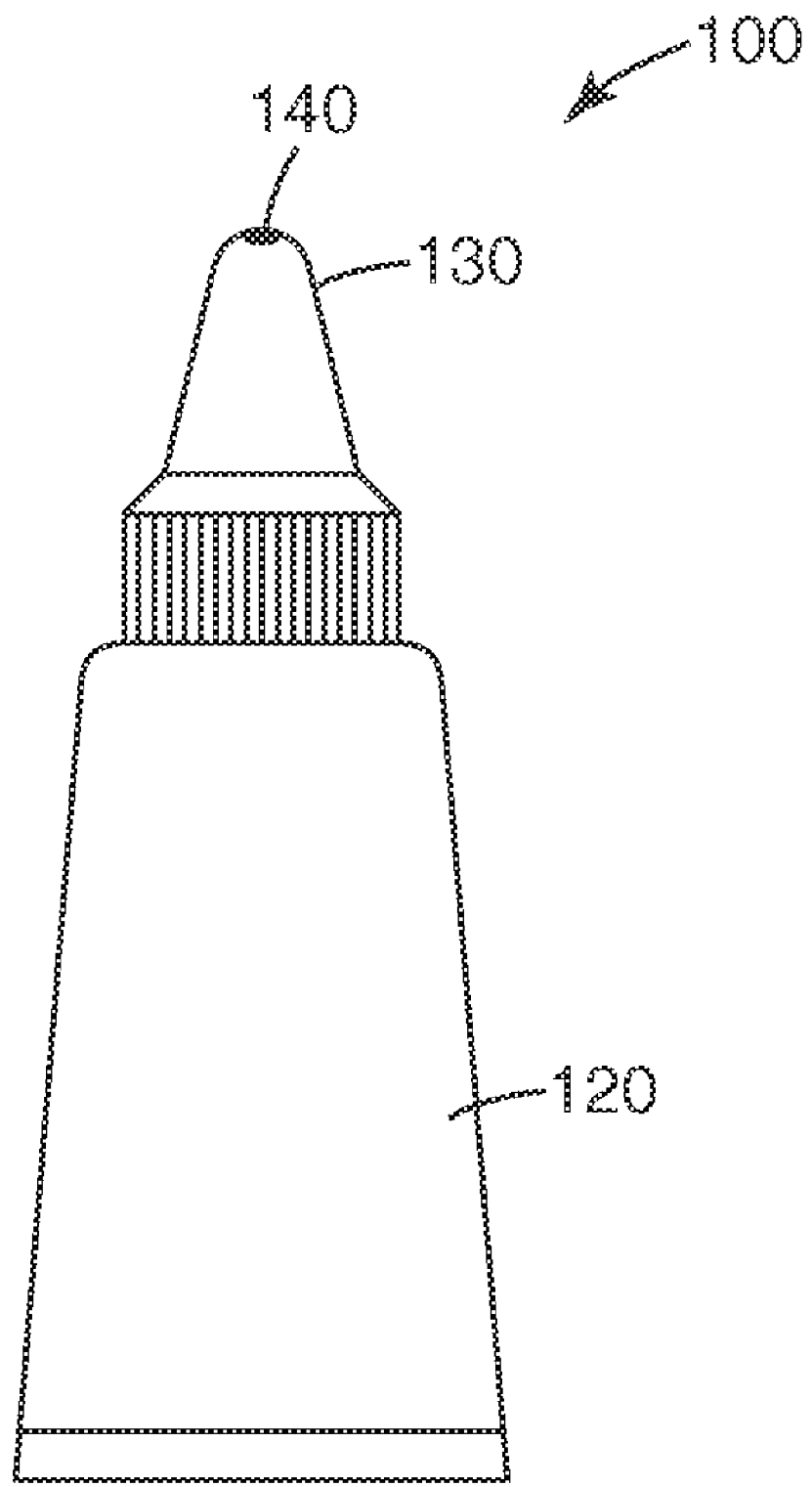
FIG. 1 is a schematic view of an illustrative adhesive dispenser.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable generally to adhesives and their manufacture, as well as apparatus for dispensing such improved adhesives. While the present invention is not so limited, an appreciation of various aspects of the invention will be gained through a discussion of the examples provided below.

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5). As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

The present invention provides an improved adhesive. The improved adhesive includes a polymer adhesive material, and a thickener. The improved adhesive has two or more of the following physical properties: a limited stringing length; a limited phase lag; a limited sag distance; a viscosity such that the adhesive is flowable; a limited set time; a range of complex shear modulus; and the adhesive composition may not be thixotropic. Many of these properties can be determined by the methods set in the Methods section below.

The adhesive composition can have a limited stringing length. Stringing length of an adhesive can be determined by the stringing length method defined in the Methods section below. A limited stringing length can aid in precise placement of flowable adhesives. In some embodiments, the adhesive composition can have a stringing length of 0 to 9 cm, or 0 to 5 cm, 0 to 3 cm, or 0 to 2 cm.

The adhesive composition can have a limited shear modulus phase lag. Shear modulus phase lag or "phase lag," can be determined by the phase lag method defined in the Methods section below. In some embodiments, the adhesive composition can have a phase lag of 0 to 45 degrees, or 0 to 30 degrees, or 0 to 20 degrees.

The adhesive composition can have a limited sag distance when placed on a vertical surface. Sag distance or sag resistance can be determined by the sag distance method defined in the Methods section below. A limited sag distance can aid in keeping adhesive on a surface where it is placed. In some embodiments, the adhesive composition can have a sag distance of 0 to 10 mm, or 0 to 5 mm, or 0 to 2 mm.

The adhesive composition can have a viscosity such that the adhesive is flowable. Viscosity can be determined via a Brookfield RVT with a #6 spindle at 20 rpm at ambient conditions. In some embodiments, the adhesive composition can have a viscosity of 3,000 to 50,000 cP, or 3,000 to 30,000 cP, or 10,000 to 30,000 cP.

The adhesive composition can have a limited set time. Set time of the adhesive can be determined by the set time method defined in the Methods section below. In some embodiments, the adhesive composition can have a set time of 0 to 180 seconds, or 0 to 60 seconds, or 0 to 45 seconds.

The adhesive composition can have a range of complex shear modulus G*. Complex shear modulus G* can be determined by the complex shear modulus method defined in the Methods section below. In some embodiments, the adhesive composition can have a complex shear modulus G* of 50 to 1000 Pa, or 100 to 600 Pa.

In some embodiments, the adhesive composition includes a polymer adhesive material and a thickener where the adhesive composition has a stringing length of 9 cm or less and a phase lag of 45 degrees or less. In another embodiment, the adhesive composition includes a polymer adhesive material and a thickener where the adhesive composition has a stringing length of 9 cm or less and a sag distance of 10 mm or less. In other embodiments, two or more of the above identified physical properties can be combined, as desired.

The improved adhesive composition can be formed by combining an adhesive polymer, a thickener, and water. The adhesive polymer can be a vinyl acetate polymer. The thickener can be an alkali swellable thickener. In some embodiments, the adhesive composition can have a glass transition temperature in a range of −60 to 100 degrees Celsius, or, −50 to 50 degrees Celsius, −20 to 30 degrees Celsius. As used herein, glass transition temperatures of the adhesive composition are taken from dried adhesive compositions. In illustrative embodiments, the adhesive composition can have a total solids content from 5 to 85 wt %, or 30 to 85 wt %, or 60 to 80 wt %, as desired.

In some illustrative embodiments, the adhesive composition can have a pH of 4 to 10, or 5 to 10, or 6 to 9. In other embodiments the adhesive composition can be considered as being "acid-free" and have a pH of 7 to 9. In some embodiments, an alkali or alkaline material can be added to the adhesive composition in any useful amount.

Vinyl acetate polymers include, for example, vinyl acetate homopolymers and vinyl acetate co-polymers such as, for example, vinyl acetate-ethylene (VAE). These vinyl acetate polymers can be combined in water to form a polymer dispersion. Vinyl acetate based polymers can be obtained by conventional emulsion polymerization and are commercially available from a variety of sources.

One or more co-monomers can be co-polymerized with vinyl acetate. In some embodiments, the vinyl acetate polymer includes vinyl acetate, ethylene, and optionally one or more other ethylenically unsaturated monomers. Illustrative examples of other ethylenically unsaturated monomers are $C_3$-$C_{10}$ alkenoic acids, such as acrylic acid, methacrylic acid, crotonic acid and isocrotonic acid and their esters with $C_1$-$C_{18}$ alkanols, such as methanol, ethanol, propanol, butanol, and 2-ethylhexanol; vinyl halides, such as vinyl chloride; alpha, beta-unsaturated $C_4$-$C_{10}$ alkenedioic acids such as maleic acid, fumaric acid, and itaconic acid and their monoesters and diesters with the same $C_1$-$C_{18}$ alkanols; and nitrogen containing monoolefinically unsaturated monomers, such as nitriles; amides; N-methylol amides; lower alkanoic acid ethers of N-methylol amides and allylcarbamates, such as acrylonitrile, acrylamide, methacrylamide, N-methylol acrylamide, N-methylol methacrylamide, N-methylol allylcarbamate, and lower alkyl ethers or lower alkanoic acid esters of N-methylol acrylamide, N-methylol methacrylamide and N-methylol allylcarbamate. Illustrative vinyl acetate-ethylene (emulsion) polymers used in this invention are commercially available products. Examples are AIRFLEX™ 320, AIRFLEX™ 323, AIRFLEX™ 400, AIRFLEX™ 400H, AIRFLEX™ 401, AIRFLEX™ 405, AIRFLEX™ 410, AIRFLEX™ 420, AIRFLEX™ 423, AIRFLEX™ 426, AIRFLEX™ 460, AIRFLEX™ 465, AIRFLEX™ 7200, AIRFLEX™ 920, AIRFLEX™ EN421, AIRFLEX™ EP17, AIRFLEX™ 315, AIRFLEX™ 418, AIRFLEX™ EF350, and AIRFLEX™ EF940, all available from Air Products Polymers, L.P., (Allentown, Pa.) and ELVACE™ 722, ELVACE™ 725, ELVACE™ 731, ELVACE™ 732, ELVACE™ 733, ELVACE™ 734, ELVACE™ 735, ELVACE™ 736, ELVACE™ 737, ELVACE™ 739, ELVACE™ 741, and ELVACE™ 758 available from Forbo Adhesives, LLC (Durham, N.C.) and DUR-O-SET™ E-200, DUR-O-SET™ E-200, DUR-O-SET™ E-230, DUR-O-SET™ E-130, DUR-O-SET™ E-200HV, DUR-O-SET™ E-150, DUR-O-SET™ E-260, DUR-O-SET™ E-100, DUR-O-SET™ E-220, DUR-O-SET™ E-171HS, DUR-O-SET™ C-325, DUR-O-SET™ C-310, DUR-O-SET™ C-335, RESYNY™ 1025, RESYN™ 1072, RESYN™ 1601, and RESYN™ SB-321 available from Vinamul Polymers, (Enoree, S.C.) and WB-3621, WB-3621 available from H.B. Fuller Co. (St Paul, Minn.). Commercially available vinyl acetate polymers, as provided, typically can have a viscosity ranging from 500 to 3000 cP.

Vinyl acetate polymers can be present in the adhesive compositions in any useful amount. In some embodiments, vinyl acetate polymers are present in the adhesive composition from 5 to 75 wt %, or from 20 to 75wt %, or 50 to 75 wt %, as desired.

Alkali swellable thickeners include alkali swellable acrylic thickeners. These acrylic thickeners can be termed an "associative thickener" and can be anionic alkali swellable acrylic aqueous emulsion copolymers containing carboxylic acid groups. These alkali swellable thickeners can be substantially cross-linked. A partial listing of suitable alkali swellable acrylic thickeners includes those commercially available under the trade name Rhoplex™ ASE-60, from Rohm and Haas Co. (Philadelphia, Pa.) and Rohagit™ SD 15 available from Polymer Latex GmbH & Co. KG, (Marl, Del.) and Carbopol™ and Pemulen™ series thickeners from Noveon, Inc (Cleveland, Ohio).

Alkali swellable thickeners can be present in the adhesive compositions in any useful amount. In some embodiments, Alkali swellable thickeners are present in the adhesive composition from 0.1 to 10 wt %, or from 0.1 to 5 wt %, or 0.1 to 3 wt %, as desired.

An alkali material or alkalinity source can be combined with the alkali swellable thickener during the formation of the adhesive composition. The alkalinity source can be a strong base material or a source of alkalinity which can be an organic source or an inorganic source of alkalinity. For the purposes of this invention, a source of alkalinity also known as an alkali material is a composition that can be added to an aqueous system and result in a pH greater than about 7. Organic sources of alkalinity are often strong nitrogen bases including, for example, ammonia, monoethanol amine, monopropanol amine, diethanol amine, dipropanol amine, triethanol amine, tripropanol amine, etc. The source of alkalinity can also comprise an inorganic alkali. The inorganic alkali can be derived from sodium or potassium hydroxide which can be used in both liquid (about 10-60 wt % aqueous solution) or in solid (powder, flake or pellet) form. Other inorganic alkalinity sources are soluble silicate compositions such as sodium metasilicate or soluble phosphate compositions such as trisodium phosphate, or any other buffer derived from phosphoric acid. Exemplary alkalinity sources include ammonia, or triethanol amine. The alkalinity source can include an alkali metal carbonate. Alkali metal carbonates which may be used include sodium carbonate, potassium carbonate, sodium or potassium bicarbonate or sesquicarbonate, among others. The alkali material can be provided in the adhesive composition in any useful amount.

The adhesive compositions of the invention can optionally include fillers. Fillers can be organic or inorganic fillers and can be present in the adhesive in any useful amount. Fillers can be any organic or inorganic additives such as, for example, antioxidants, stabilizers, antiozonants, plasticizers, dyes, U.V. absorbers, HALS, and pigments. In one embodiment, the adhesive composition includes a "glitter" material as a filler. The glitter material can add sparkle and/or color to the adhesive as desired. The adhesive compositions of the invention can optionally include colorants, such as pigments or dyes, to provide a tint or color to the adhesive composition.

In some embodiments, the adhesive composition can include 5 to 75 wt % vinyl acetate polymer, 0.1 to 10 wt % alkali swellable thickener, and a balance water. In other embodiments, the adhesive composition can include 20 to 75 wt % vinyl acetate polymer, 0.1 to 5 wt % alkali swellable thickener, and a balance water. In other embodiments, the adhesive composition can include 50 to 75 wt % vinyl acetate polymer, 0.1 to 3 wt % alkali swellable thickener, and a balance water. In some of these embodiments, the formation of the adhesive composition can include the addition of an alkali material that may activate or swell the alkali swellable thickener material and provide a resulting adhesive composition that can have a pH of 7 to 9. In illustrative embodiments, the alkali swellable thickener material is substantially cross-linked. These embodiments can possess two or more of the following physical properties (as described above): a limited stringing length; a limited phase lag; a limited sag distance; a viscosity such that the adhesive is flowable; a limited set time; a range of complex shear modulus; and the adhesive composition may not be thixotropic.

FIG. 1 shows an illustrative adhesive dispenser 100 that can hold and dispense the improved adhesive described herein. The dispenser 100 can include an adhesive containing portion 120 that contains the adhesive prior to being dispensed. In some embodiments, the containing portion 120 is formed of a flexible material such as a polymeric material. The dispenser can contain any useful amount of adhesive such as, for example, 0.5 to 5000 ml, or 0.5 to 1000 ml, or 50 to 500 ml. The dispenser 100 can include a dispensing portion 130 disposed on the containing portion 120. The dispensing portion 130 can include a dispenser opening 140. In one embodiment, adhesive can be dispensed by a user by the user applying finger pressure to the flexible containing portion 120 which urges adhesive material toward and through the dispenser opening 140 to the application target. In some embodiments, the dispenser opening 140 has an area in a range 0.05 to 40 $mm^2$, 0.1 to 30 $mm^2$, 0.1 to 10 $mm^2$, 0.2 to 1.8 $mm^2$, 0.5 to 1.5 $mm^2$, or 0.75 to 1.25 $mm^2$, as desired.

Described herein are adhesive compositions exhibiting a unique combination of rheology and fast set time, and when applied to paper substrates, can reduce the amount of curl/cockle observed. These adhesive compositions are easily and precisely dispensed from a fine tipped applicator using only hand pressure to apply. Such adhesive/dispenser combinations are often used in performing craft projects, household repairs, or scrapbooking activities.

The combination of adhesive rheology and fine tipped dispensers provides excellent control during adhesive dispensing and allows the user to effortlessly apply the adhesive in any shape desired (fine or coarse dots, streaks, lines, etc). The adhesive rheology can also assist in the creation of thin bond lines due to the ease with which the adhesive spreads when compressed lightly between adherents with modest lamination pressure, e.g., light hand pressure used to laminate paper card stock together. Such thin adhesive bond lines can also contribute to fast adhesive drying since the thin cross-sectional area of the adhesive increases the rate at which moisture is removed from the adhesive. In addition the rheology provided by associative thickened adhesive polymers described herein also minimizes/eliminates the tendency of the adhesive to string or leg when applied in small drops or in a fine continuous bead, thus allowing more precise application of the adhesive.

Advantages of the invention are illustrated by the following examples. However, the particular materials and amounts thereof recited in these examples, as well as other conditions and details, are to be interpreted to apply broadly in the art and should not be construed to unduly limit the invention.

Methods

Set Time

This test involves the following steps:

1. Coat a stripe (5-10 cm wide) of adhesive (~3 grams) onto a first sheet of test paper (6" wide IP Thilmany 50# Bleached Andro Base Paper) to obtain a 0.23 mm thick wet adhesive coating;
2. While adhesive is wet, laminate a second sheet of the test paper, which has been pre-cut into 0.5" width strips, to the first sheet of test paper;
3. Laminate the two sheets together by rolling with a 4.5 lb rubber roller; and 4. Peel the 0.5" width paper strips from the laminate at regular time intervals to determine how long it takes to develop sufficient strength to tear the test paper strip.

Sag Resistance or Distance

Adhesive sag resistance is assessed by depositing a 0.1 ml drop of adhesive near an end of a horizontally positioned 2 mil clean thick strip of poly(ethylene terephthalate) (PET) film measuring ~15 cm×25 cm.

Immediately following adhesive deposition, the PET film is positioned vertically, with the adhesive drop located at the top of sheet, which allows the adhesive to flow downward along the length of the film strip.

When adhesive flow has ceased, the distance, in millimeters (mm), the adhesive has flowed is measured and recorded. The specific distance measured is that distance from the bottom edge of the original adhesive drop, prior to orienting vertically, to the bottom most edge of the adhesive flow once the adhesive flow has ceased.

Stringing Length

This test method provides a means of assessing the extent to which an adhesive strings when dispensed. In general the test method involves dispensing glue through a vertically oriented syringe needle at fixed rate, and measuring the length of the glue fiber/strand that forms as the glue extends from the needle and falls to a stage below.

The longer the strand the higher the extent of stringing, the shorter the strand the lower the extent of stringing. This test method is conducted in a constant temperature room having temperature of 22° C. and a relative humidity of 50% and employs the following equipment.

1. Syringe pump, catalog # 55-2226, Harvard Apparatus, So Natick, Mass. 01760
2. 16 ga×38 mm PrecisionGlide™ Needle 16G 1½ disposable syringe needle, 1.19 mm 1D, Becton Dickinson & Co, Franklin Lakes, N.J. 07417-1884
3. 10 ml Luer Norm-Ject disposable syringe, Henke Sass Wolf GMBH, Tuttlingen, Germany
4. Teflon tubing 3.2 mm ID×152 mm length fit with male/female Luer connections on opposite ends to provide a flexible connection between the syringe and the needle
5. Laboratory jack
6. Laboratory jack stand
7. Small laboratory clamp
8. Cylindrical sleeve constructed from 0.45 mm thick clear polycarbonate ~14 cm dia×38 cm tall and slotted appropriately to allow clearance for clamp and Teflon tubing clearance.

Equipment Preparation and Layout

The syringe/tubing/needle assembly is arranged with the syringe mounted horizontally in the syringe pump and needle oriented vertically, such that the extruded adhesive discharges straight downward from the needle tip.

The small clamp is affixed to the vertical member of the jack stand and the needle is secured with the clamp to maintain orientation during the test. The lab jack is placed on the jack stand below the needle to provide a movable stage onto which the flowing adhesive impinges. The range of lab jack motion is ~38 cm total, i.e., the jack can be elevated to touch the tip of the needle and can be lowered 38 cm below the tip of the needle.

The polycarbonate sleeve is used as a draft eliminator to reduce the effect of any air motion on the falling strand of adhesive. The sleeve is placed on the jack such that it is concentric with the circumference of the needle barrel. Two longitudinal slots are required on the sleeve to allow the sleeve to pass by the small clamp and the flexible tubing as the lab jack is raised or lowered.

The needle was shortened, using a die grinder fit with cut-off wheel, to provide a square end on the barrel of the needle and a length of 6.4 mm, i.e., 6.4 mm of needle protruded from the hub. The shortened needle barrel was deburred with 320 grit sandpaper. The square-ended needle barrel allows uniform discharge of the adhesive from the needle and minimizes any tendency for the extruded adhesive to drag or distort upon exiting the needle.

Testing Procedure

The adhesive is free of bubbles prior to performing this test. The syringe is filled with adhesive by immersing the syringe tip into the adhesive and gently withdrawing the plunger to fill the syringe. Care must be taken during this operation to avoid introducing air into the adhesive as this deleteriously affects the test outcome, i.e., air bubbles in the discharged adhesive can cause flaws in the stream that result in premature breakage of the falling stream. The filled syringe is fit with the flexible connection tube and needle, and mounted in the syringe pump. The pump is started to provide an adhesive flow of 1.75 milliliters/minute (ml/min). The syringe needle is initially held by hand and oriented to discharge straight upward in order to purge any air from the flexible line, connections, or needle.

When a bubble free adhesive stream is observed exiting the needle the pump is stopped, the needle orientation reversed (to discharge straight down), the needle clamped in position for testing, and the jack and cylindrical sleeve placed as described above.

To run the test the stage is positioned at a distance of 2.5 cm from the needle tip, the pump started, and the adhesive stream observed. If the adhesive stream is stable and continuous the stage is slowly lowered in 1 cm increments, with a 5 second observation time required at each height, until the stream breaks. The stage is then raised until the flow reconnects to provide a continuous stream. The stage is lowered in steps to the point at which the stream breaks-off, and the distance at which a continuous flow occurred is recorded (i.e., that distance from the needle tip to the stage).

This protocol is repeated 2 more times to obtain a total of 3 separate measurements of the maximum distance at which a continuous strand could be observed. If upon starting the test the stream is discontinuous, the stage is raised to a point at which the flow connects to provide a continuous stream and the protocol described above followed to complete the test. For certain adhesives, during the course of the test, the dispensed adhesive collecting on the stage may tend to pile up, thus when recording the maximum distance at which a continuous flow occurred, any buildup on the stage must be taken into account, i.e., the build-up distance (the height from the stage to the top of the adhesive pile) subtracted from the overall measured distance. The average of the three measurements is recorded as the "Continuous Fiber Stringing Length" and reported in centimeter units. If the test is not completed with a unitary syringe filling, the test can be restarted with another syringe filling at the preceding stage height and run to completion.

Shear Modulus (Phase Lag "δ" and Complex Shear Modulus "G*")

Dynamic mechanical properties of the samples were measured with a Bohlin CVO 120 HR NF rheometer. Bohlin rheometers are available from Malvern Instruments Ltd., Enigma Business Park, Grovewood Road, Malvern, Worcestershire, United Kingdom, WR14 1XZ. All measurements were taken using the Bohlin C25 Mooney-Couette geometry at 25 degrees Celsius. A trap was placed over the top of the C25 cup to retard sample drying. Evaporation traps are available from Malvern Instruments.

The dynamic mechanical properties of interest are the complex shear modulus, G*, and the phase lag, which is also sometimes called phase shift. These two parameters are often used to describe the relationship between stress and strain for materials, and in particular for viscoelastic materials, Materials with high moduli provide greater resistance to an applied stress, resulting in smaller strains, than those with low moduli. The phase lag is, by definition, bounded between zero and 90 degrees and represents the relative levels of elastic and viscous response of the sample to the applied stress, Purely elastic (i.e., Hookean) materials have a zero degree phase lag and purely viscous materials have a 90 degree phase lag relative to the oscillatory stress.

G* and δ were measured by loading 17 grams of each sample into the rheometer. The samples were equilibrated to 25" C., sheared for 30 seconds at 50 s$^{-1}$, and then allowed to rest for 30 seconds before each test was run. Sinusoidally oscillating stresses were applied to each sample at a frequency of 1 Hz. Ten stress amplitudes, increasing logarithmically from 0.1 Pa to 100 Pa, were chosen as test conditions. The values of G* and δ at 1.7 Pa recorded by the instrument are used here.

EXAMPLES

Materials

Airflex™ 7200, VAE copolymer emulsion provided at ~72.5% solids, pH 4.5-5.5, Tg 0° C., Air Products Polymers, L.P., Allentown, Pa.

Airflex™ 465, VAE copolymer emulsion provided at ~67% solids, pH 4.5-5.5, Air Products Polymers, L.P., Allentown, Pa.

Elvace™ 737, VAE copolymer emulsion provided at 67-70% solids, pH 4-5, Forbo Adhesives, LLC, Durham, N.C.

Rhoplex™ ASE-60, alkali swellable associative thickener supplied at 28% solids, Rohm and Haas Co., Philadelphia, Pa.

Ammonium hydroxide, 28-30% NH3, EM Science, Gibbstown, N.J.

Aleene's Fast Crab Tacky Clue™, Duncan Enterprises, Fresno, Calif.

Aleene's Original Tacky Glue™, Duncan Enterprises, Fresno, Calif.

Aleene's Quick Dry Tacky Glue™, Duncan Enterprises, Fresno, Calif.

Elmer's Glue-All™, Elmer's Products, Inc., Columbus, Ohio.

Kelzan™ S, xanthan gum, lot 40863A, CP Kelco U.S., Inc., San Diego, Calif.

Sodium carboxymethylcellulose (Na CMC), type 7H4XF, lot 83724, Aqualon Division of Hercules Inc., Wilmington, Del.

Kelgin™ MDH, sodium alginate, lot 281211, ISP Technologies Inc., San Diego, Calif.

Laponite™ RD, synthetic layered silicate, Southern Clay Products, Inc., Gonzales, Tex.

General Preparation Procedure

The inventive adhesive examples described herein typically consist of an adhesive polymer, associative thickener, water, and base. Such samples are prepared by combining the adhesive polymer, thickener, and water in a vessel and mixing well with a motor driven marine propeller to obtain a uniform composition. With continued stirring the base is added in a single charge and agitation continued until the adhesive composition is well mixed.

Examples 1, 2, 3, 5, 6, 7, 8

These Examples were prepared by the foregoing procedure and consisted of the materials and quantities (in grams) shown in Table 1. The resulting adhesives were characterized for Brookfield viscosity, set time, stringing, and rheology according to the test methods set forth above. The results are reported in Table 4.

TABLE 1

| Sample | Adhesive | Adhesive Amount | Rhoplex ™ ASE-60 | Water | NH$_4$OH (ml) |
|---|---|---|---|---|---|
| Example 1 | Airflex ™ 7200 | 200 | 2.0 | — | 0.7 |
| Example 2 | Airflex ™ 465 | 200 | 2.5 | — | 0.7 |
| Example 3 | Elvace ™ 737 | 200 | 3.5 | — | 1.1 |
| Example 5 | Airflex ™ 7200 | 100 | 0.5 | — | 0.35 |
| Example 6 | Airflex ™ 7200 | 100 | 4.63 | 45 | 0.51 |
| Example 7 | Airflex ™ 7200 | 11.9 | 15 | 150 | 1.3 |
| Example 8 | Airflex ™ 7200 | 61.2 | 15 | 150 | 1.3 |

Example 4

A sample of Elvace™ 737 was neutralized as follows. To 175 parts Elvace™ 737 being agitated with a mechanical stirrer was added 0.56 ml NH$_4$OH. The pH of the well mixed solution was 7.63, as measured by a pH meter. To 100 parts of neutralized Elvace™ 737 being agitated with a mechanical stirrer was added 2.67 parts Rhoplex™ ASE-60. After mixing well an additional 0.25 parts NH$_4$OH solution was added and mixed in well to complete the preparation of Example 4 and provide an adhesive having pH of 7.12. Example 4 was characterized for Brookfield viscosity, set time, stringing, and rheology. The results are reported in Table 4.

Comparative Examples C4, C5, C6, C7

This series of comparative examples consisted of common commercially available consumer white glues listed in Table 2. These Examples were characterized for Brookfield viscosity, set time, stringing, and rheology. The results are reported in Table 4.

TABLE 2

| Example | Adhesive |
|---|---|
| C4 | Aleene's Fast Grab Tacky Glue ™ |
| C5 | Aleene's Original Tacky Glue ™ |
| C6 | Aleene's Quick Dry Tacky Glue ™ |
| C7 | Elmer's Glue-All ™ |

Comparative Examples C8, C9, C10, C11

This series of Comparative Examples employ as the adhesive neutralized Elvace™ 737 from Example 4. The adhesive, thickeners, and amounts of each are provided in Table 3. Samples were prepared by adding the thickener charge slowly to Elvace™ 737 that was agitated with a mechanical stirrer and mixed for 15 minutes until the additive was well incorporated. After standing for 24 hr some of the samples appeared to contain small gel particles that could possibly be attributed to thickener that was either swollen or not completely dispersed initially. Each sample was mixed again for 15 minutes at which time all samples appeared very smooth. Samples were additionally assessed for uniformity on a fineness of grind gauge (Precision Gage & Tool Co, Dayton, Ohio) which showed all to be smooth, uniform, and free of particulate. At this time some of the samples had an additional charge of Elvace™ 737 added to them and mixed in well as shown in Table 4. These Examples were characterized for Brookfield viscosity, set time, stringing, and rheology. The results are reported in Table 4.

TABLE 3

| Comparative Example | Elvace™ 737 | Thickener Type | Thickener | Additional Elvace™ 737 |
|---|---|---|---|---|
| C8 | 100 | Kelzan™ S | 0.38 | — |
| C9 | 100 | Na CMC | 0.31 | 24 |
| C10 | 100 | Kelgin™ MDH | 0.17 | 30.8 |
| C11 | 100 | Laponite™ RD | 0.50 | 71.8 |

TABLE 4

| Example | Brookfield Viscosity[1], cP | Set Time, s | Continuous Fiber Stringing Length, cm | Sag Distance mm | Shear Modulus[2] G*, Pa 1 Hz, 1.7 Pa | δ, deg 1 Hz, 1.7 Pa |
|---|---|---|---|---|---|---|
| 1 | 30000 | 48 | 2 | 2 | 542 | 13 |
| 2 | 23500 | 45 | 1 | 4 | 401 | 12 |
| 3 | 23500 | 48 | 2 | 9 | 264 | 18 |
| C1 | 3500 | 38 | 1 | 61 | 9 | 63 |
| C2 | 2500 | 35 | 1 | 71 | 9 | 63 |
| C3 | 3000 | 38 | 1 | 73 | 5 | 67 |
| 4 | 37000 | 58 | 9 | 3 | 896 | 16 |
| 5 | 8750 | 57 | 3 | 9 | 163 | 17 |
| 6 | 14750 | 72 | 2 | 0 | 490 | 11 |
| 7 | 10750 | >240 | 2 | 5 | 270 | 8 |
| 8 | 13000 | 73 | 2 | 4 | 341 | 9 |
| C4 | 195000 | 68 | too visc to measure | 22 | 705 | 77 |
| C5 | 41500 | 85 | 27 | 33 | 192 | 82 |
| C6 | 8500 | 63 | 5 | 68 | 34 | 80 |
| C7 | 6000 | 105 | 2 | 115 | 29 | 88 |
| C8 | 22250 | 48 | 15 | 6 | 157 | 22 |
| C9 | 25500 | 42 | 11 | 3 | 249 | 22 |
| C10 | 23750 | 53 | 12 | 6 | 314 | 24 |
| C11 | 11500 | 45 | 10 | 0 | 194 | 15 |

[1]data taken with Brookfield RVT, spindle #6, 20 rpm, except C4 measured at 5 rpm The complete disclosure of all patents, patent documents, and publications cited herein are incorporated be reference, The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

We claim:

1. A method for producing an adhesive composition consisting of: a vinyl acetate-ethylene copolymer; an alkali swellable thickener; water; and a source of alkalinity; wherein the vinyl acetate-ethylene copolymer is dispersed within the water and the adhesive composition has a pH of 4 to 10; and wherein the adhesive composition has a stringing length of 9 cm or less, a set time of 180 seconds or less, and one or more of the following properties: a phase lag of 45 degrees or less; a viscosity of 3,000 to 50,000 cP; a complex shear modulus of 50 to 1000 Pa; and a sag distance of 10 mm or less.

2. The method of claim 1, wherein the vinyl acetate-ethylene copolymer is present in the adhesive composition at 5 to 75 wt % and the alkali swellable thickener is present in the adhesive composition at 0.1 to 10 wt %.

3. The method of claim 2, wherein the vinyl acetate-ethylene copolymer is present in the adhesive composition at 20 to 75 wt % and the alkali swellable thickener is present in the adhesive composition at 0.1 to 5 wt %.

4. The method of claim 2, wherein the vinyl acetate-ethylene copolymer is present in the adhesive composition at 50 to 75 wt % and the alkali swellable thickener is present in the adhesive composition at 0.1 to 3 wt %.

5. The method of claim 1, wherein the alkali swellable thickener is an anionic alkali swellable thickener.

6. The method of claim 1, further comprising adjusting the pH to between 6 and 9.

7. The method of claim 1, wherein the adhesive composition has a total solids content of 5 to 85%.

8. The method of claim 7, wherein the adhesive composition has a total solids content of 30 to 85%.

9. The method of claim 7, the adhesive composition has a total solids content of 60 to 80%.

10. The method of claim 1, wherein the adhesive composition has a phase lag of 30 degrees or less.

11. The method of claim 10, wherein the adhesive composition has a sag distance of 5 mm or less.

12. The method of claim 10, wherein the adhesive composition has a sag distance of 2 mm or less.

13. The method of claim 1, wherein the adhesive composition has a viscosity of 3,000 to 30,000 cP.

14. The method of claim 13, wherein the adhesive composition has a viscosity of 10,000 to 30,000 cP.

15. The method of claim 1, wherein the adhesive composition has a set time 60 seconds or less.

16. The method of claim 1, wherein the adhesive composition has a complex shear modulus of 100 to 600 Pa.

17. The method of claim 1, wherein the adhesive composition has a stringing length of 5 cm or less.

18. The method of claim 17, wherein the adhesive composition has a stringing length of 3 cm or less.

19. A method of bonding a first adherent to a second adherent, comprising:
    applying an adhesive composition to the first adherent; and
    placing the second adherent in contact with the adhesive composition, wherein the adhesive composition being produced by the method of claim 1.

* * * * *

UNITED STATES PATENT AND TRADEMARK OFFICE
CERTIFICATE OF CORRECTION

PATENT NO. : 7,560,507 B2 Page 1 of 1
APPLICATION NO. : 11/668336
DATED : July 14, 2009
INVENTOR(S) : Kurt C. Melancon It is certified that error appears in the above-identified patent and that said Letters Patent is hereby corrected as shown below:

Column 1,
Line 41, delete "tag")" and insert -- lag") --, therefor.

Column 4,
Line 25, delete "nitrites;" and insert -- nitriles; --, therefor.

Line 52, delete "RESYNY™" and insert -- RESYN™ --, therefor.

Column 9,
Line 9, delete "materials," and insert -- materials. --, therefor. (Second Occurrence)

Line 14, delete "stress," and insert -- stress. --, therefor.

Line 20, delete "25"" and insert -- 25° --, therefor.

Line 44, delete "Crab" and insert -- Grab --, therefor.

Line 44, delete "Clue™" and insert -- Glue™ --, therefor.

Column 11,
Line 46, delete "¹data" and insert -- 1-data --, therefor.

Column 12,
Line 31, in claim 9, after "7," insert -- wherein --.

Signed and Sealed this

Eighth Day of September, 2009

David J. Kappos
*Director of the United States Patent and Trademark Office*